United States Patent Office 3,578,466
Patented May 11, 1971

3,578,466
PICKLED VEGETABLE PRODUCT AND
PROCESS OF PREPARATION
Frederick Hugo Luckmann, Westfield, and Daniel Melnick, Teaneck, N.J., assignors to CPC International Inc.
No Drawing. Filed May 21, 1968, Ser. No. 730,953
Int. Cl. A23b 7/10
U.S. Cl. 99—156                                5 Claims

ABSTRACT OF THE DISCLOSURE

The present invention relates to enhancing on aging the flavor, color, and texture of pickled vegetables by the addition of an edible alkylenediaminetetracarboxylic acid component in minor proportions. The alkylenediaminetetracarboxylic acid component is added either in a brine solution in which the vegetables to be pickled are treated, or in the pickling syrup solution during the manufacture of vegetable pickles. The alkylenediaminetetracarboxylic acid component is present in amounts ranging from 0.004% to 0.04%. There is a synergistic reaction between the alkylenediaminetetracarboxylic acid component and calcium chloride, the latter in 0.04 to 0.1% concentration, in providing aged products of improved crispness.

DISCLOSURE

The present invention relates to pickled vegetable products and processes for the preparation thereof. More particularly, the present invention relates to adding an edible alkylenediaminetetracarboxylic acid component to pickled vegetable products to enhance the shelf-life, flavor, color and texture.

One problem confronting the manufacturer of pasteurized pickled products, packed in jars, particularly the so-called fresh packed pickles, is that with age there is deterioration of flavor, color, and texture. The deterioration is noticeable within six months, at ambient temperatures, from the time of manufacture of the pickles. The rate of deterioration may depend upon the quality of the vegetables used in preparing the pickled products and the process of pickling.

Many types of pickled vegetables are scorned by the consumer for acceptability by their crispness. This is particularly true of cucumber pickles although other pickled vegetables such as cauliflower, carrots, and even onions are most desirable when crisp.

Calcium chloride has been used conventionally as an additive to assist in retention of crispness of cucumber pickles. However, it has been noted that the addition of calcium chloride, while maintaining crispness of the pickle meats, causes the rind to become tough and rubbery.

Thus, it is an object of the invention to provide a pickled vegetable product which retains its crispness throughout.

It is another object of the invention to provide pickled vegetable products having superior retention of flavor, color, and texture on aging.

Still another object of the invention is to provide a process for preparing pickled vegetable products having superior flavor, texture, and color, particularly on aging.

Yet another object is to provide a process for preparing a cucumber pickle product having crisp meats and crisp rinds.

A still further object is to provide an economic pickled cucumber product which retains crispness in both the meat of the pickle and the rind.

A further object of the invention is to provide an economical process for the manufacture of pickled products having improved storage life.

Other objects of the invention will be apparent from the following description and appended claims.

The present invention provides a pickled vegetable product containing from about 0.004% to about 0.04% by weight of an edible alkylenediaminetetracarboxylic acid component.

The invention further provides a process for preparing a pickled vegetable product of superior texture, flavor, and color which comprises immersing the vegetable material in an aqueous medium containing an edible alkylenediaminetetracarboxylic acid component, and thereafter packing the pickles in a suitable container.

The process also includes immersing the vegetable material in a salt-containing brine for a brief period of time, subsequently removing the brine, immersing the pickles in a syrup containing an edible alkylenediaminetetracarboxylic acid component, and thereafter packing the pickles in a suitable container.

There are many different types of pickles. Among the kinds most commonly known are fresh-pack pickles, sweet pickles, sour pickles, dill pickles, brine pickles and the like. Although the processes for making the different types of pickles differ considerably, in each case the vegetable material to be pickled is immersed in an aqueous medium at some time during processing. In the practice of the present invention, the alkylenediaminetetracarboxylic acid component may be added to any of the aqueous mediums at any point in the processing.

It has been found most desirable for the final pickle product in its entirety including any syrup or aqueous medium in which the pickle is packed, to contain from about 0.004% to about 0.04% by weight of the alkylenediaminetetracarboxylic acid component. It has also been found that the vegetable material absorbs approximately half of the alkylenediaminetetracarboxylic acid component that is added to the first aqueous brine medium in which the vegetable material is immersed, when the ratio of aqueous medium to vegetable material is about 1. Thus, if the aqueous medium in the volume indicated and containing the alkylenediaminetetracarboxylic acid component is to be removed during processing, it is desirable to add twice as much of the alkylenediaminetetracarboxylic acid component so that the final product will contain from about 0.004% to about 0.04% by weight.

Vegetable materials suitable for use in the present invention include cucumbers, onions, carrots, cauliflower, cabbage, watermelon, beets, peppers, and the like.

In a typical example, fresh cucumbers are sliced and immersed in a salt-containing brine for a period of time from about 1 to 24 hours. The brine is then drained from the cucumber slices and the slices are immersed in a syrup containing an edible alkylenediaminetetracarboxylic acid component. The pickles usually with added flavorings and seasoning are thereafter packed in a suitable container and pasteurized. The resulting pickle product would be classed as fresh-pack cucumber pickles. Other types of cucumber products which benefit from the addition of the alkylenediaminetetracarboxylic acid component include dill pickles, sour pickles, brine pickles, or the like.

Dill pickles are prepared by fermentation of fresh cucumbers or other vegetable material in a salt brine or are made from salt stock. In each case the fermentation medium or the salt stock contains dill, as well as other spices, acetic acid, some sugar, or the like. It is to this aqueous medium that the alkylenediaminetetracarboxylic acid component is added.

Sour pickles are prepared from fermented salt stock. In preparing the stock, the pickles are first brought to the desired salt content, allowed to ferment and generally are packed in a 5% acid vinegar. The alkylenediaminetetracarboxylic acid component may be added to the first salt solution or to the final packing aqueous medium.

Sweet pickles may be prepared using the fresh-pack or prior fermentation approach. For the fresh-pack they are preferably treated in a brine for a short period of time and the excess brine removed. The treated cucumbers are then placed in a syrup containing acetic acid or vinegar, high sugar concentration and spices. The alkylenediaminetetracarboxylic acid component may be added to either the primary brine or the final syrup. If it is added to the first salt solution present in equal amount by weight to the cucumbers, it is preferable to approximately double the quantity of the alkylenediaminetetracarboxylic acid component inasmuch as the pickles will then absorb half and the remaining half would be removed through the removal of the excess brine. After the pickles are placed in the final syrup, the alkylenediaminetetracarboxylic acid component entrapped within the cells of the pickle will migrate into the syrup. The equilibrium state attained will show a retention of the alkylenediaminetetracarboxylic acid component in the pickles in ratio of pickles to total product. Thus, if the syrup amounts to about 1/3 of the product in the jar, the concentration of the alkylenediaminetetracarboxylic acid component in the pickles will be reduced to about 2/3 concentration. In the example given, where there have been two dilutions of the alkylenediaminetetracarboxylic acid component added to the primary brine, a dilution as a result of the addition of the pickles and a second dilution as a result of the final syrup replacing the brine, about a three-fold concentration of the desired amount of alkylenediaminetetracarboxylic acid component is added to the primary brine.

In each case, the alkylenediaminetetracarboxylic acid component is present in a quantity such that the final pickle product including the aqueous medium in which it is packed, contains an amount from about 0.004% to about 0.04% by weight. A preferred amount of alkylenediaminetetracarboxylic acid component is about 0.006% to about 0.02% by weight.

In the particular case of cucumbers or other vegetable material wherein high crispness is desired, it is preferable to add a quantity of calcium chloride. If calcium chloride is used it is added to the final aqueous medium in which the vegetable material is packed. Generally, the calcium chloride is present in an amount from about 0.04% to about 0.10%, preferably about 0.08% by weight, of the total product. It attains the same equilibrium in distribution between pickles and syrup as noted above for the alkylenediaminetetracarboxylic acid component.

The presence of the edible alkylenediaminetetracarboxylic acid component in pickles contributes substantially to the retention of the color and flavor of the pickle product on aging. Calcium chloride has been known to be a crisping agent, particularly for the fresh-pack pickles. However, when used in fresh-pack pickles it has been observed that the calcium chloride causes the rinds to become tough and rubbery. The synergistic combination of the alkylenediaminetetracarboxylic acid component and calcium chloride results in a pickle in which not only the meats remain crisp but the rinds as well. The toughness of the rinds normally developed when calcium chloride alone is used is totally eliminated, and a crisp texture exists throughout the pickle slice on aging.

The edible alkylenediaminetetracarboxylic acid component belongs to the generic group of alkylenediaminetetracarboxylic acid and its salts, which includes homologs, such as ethylenediaminetetrapropionic acid, propylenediaminetetraacetic acid, propylenediaminetetrapropionic acid, ethylenediaminediacetodipropionic acid, ethylenediaminetetraacetic acid, and their edible salts. Suitable edible metallic cations for forming the salts include sodium, potassium, and calcium, alone or in combination. Specific examples of ethylenediaminetetraacetic acid salts are the disodium salts, the tripotassium salts, the disodium monocalcium salts, and tetrasodium salts, and the like, and their hydrates. Each specific homolog is used on a molecular weight basis equivalent to ethylenediaminetetraacetic acid in the range set forth above. Although any of the homologs are useful in the present invention, it is preferable to use ethylenediaminetetraacetic acid or its edible salt.

The invention will be specifically illustrated in the following examples. In each of the examples, all of the percentages are by weight and temperatures in degrees Fahrenheit unless otherwise specified. When the alkylenediaminetetracarboxylic acid is added as its edible salt, concentration is expressed in terms of the free acid.

Example 1.—Fresh-pack cucumber pickles

Fresh cucumbers were sliced to approximately 3/8 of an inch in thickness. 100 parts by weight of the slices were immersed in 100 parts of a brine containing about 7% salt. After remaining in the brine for 16 hours, the cucumber slices were removed from the brine and immersed in 50 parts of a syrup containing 3% acetic acid, spices, 32% sugar, and 0.045% calcium disodium ethylenediaminetetraacetate. The temperature of the syrup was 175–180° F. and was maintained at that temperature for about 5 minutes. The cucumber slices in the syrup were then packed in 14 ounce jars, sealed and pasteurized at a temperature of 170° F. for 3 minutes. The packed product contained 0.015% of ethylenediaminetetraacetic acid component, 0.95% acid, 11% sugars, and 2.3% salt. The packed, sealed jars of pickles were stored at ambient room temperatures for extended periods of time including 3 months, 6 months, 9 months, 12, 15 and 18 months. At the end of each of these periods of time the pickles were opened, removed from the jar and scored for organoleptic qualities by a panel of judges. Other pickles packed simultaneously without the ethylenediaminetetraacetic acid component were similarly evaluated at the same time.

In each case, the judges noted that the pickles made in accordance with this example were of better color and flavor than those without the ethylenediaminetetraacetic acid component. This superiority was more readily apparent as the pickles became progressively older; products of 18 months age were as good as the 6 months old product made without the ethylenediaminetetraacetic acid component.

Example 2.—Fresh-pack cucumber pickles

The product of Example 1 was remade by the same process but this time calcium chloride was added to the syrup in 0.26% concentration. The final product was the same in composition as that of Example 1 but contained in addition 0.085% calcium chloride.

These packed and pasteurized pickles were stored under the same conditions as those in Example 1. When compared to pickle products containing calcium chloride alone, a decided difference was noted in the crispness of the pickle meat and particularly the texture and condition of the rind. When calcium chloride alone was used, the rind was tough and rubbery. However, the pickles of this example exhibited equal crispness in both the rinds and centers throughout the aging tests.

Example 3.—Fresh-pack cucumber pickles

Pickles were prepared as in Example 1 except that 0.045% of the ethylenediaminetetraacetic acid component was used and it was added to the salt brine instead of the syrup. The pickles were removed from the salt brine and placed in the vinegar, sugar and spice syrup, which also contained 0.26% calcium chloride by weight.

As in Example 2, tests by a panel of judges showed a highly satisfactory product with respect to color, texture and flavor throughout the period of aging of the packed pickles.

Example 4.—Dill pickles

Dill pickles are produced by the immersion of fresh whole cucumbers in a brine containing 5.3% salt, 10 to 15 pounds of cured dill weed, 1 pound of mixed spices such as celery, mustard and pepper seeds, and 1 quart of vinegar per barrel. If a kosher-style pickle is desired, one pound of garlic and/or onion may be added. Fermentation is permitted to take place over a specified period of time of about 3 to 6 months, after which ethylenediaminetetraacetic acid as the disodium salt is added in an amount of approximately 0.025% by weight of the total pickle product. The pickles and brine are then packed in jars, sealed, and pasteurized at 165° F. for 15 minutes.

The pickles so produced retain superior flavor, texture and color during storage life.

Example 5.—Salt stock pickles

Unless cucumber pickles are prepared as fresh-pack pickles, the cucumbers have a tendency to spoil. They can be preserved by brining. Pickles prepared by brining are called salt stock pickles. Fresh cucumbers are immersed in an 8% salt solution. This solution is comparable to a 30° salometer reading. The salt concentration is raised 2° each week until the brine tests a 50° salometer, after which it is raised 1° per week until the brine test reaches 60° salometer. This method is called the low salt method.

Ethylenediaminetetraacetic acid, as the free acid in about 0.0075% concentration, is added at any point during the salting process. Preferably, it is added toward the end of the salting process. After the salting process is complete, the pickles are packed in individual containers.

Products made without the ethylenediaminetetraacetic acid component become unattractively dark in color upon extended storage. The products made with the ethylenediaminetetraacetic acid component retain their original color for periods of time as long as two or three times that noted without the acid component.

Example 6

Different vegetable materials were pickled in a process as follows. The vegetable material was immersed in a brine solution containing about 7% salt. After remaining in the brine for a period of about 10 hours, the vegetable material is removed from the brine. The brined material is then immersed in a syrup containing about 40% sugars, about 3% acetic acid from vinegar, 0.26% calcium chloride and flavoring materials including celery seed, pepper, mustard, onion powder, and any other desired spices in a total of about 2% concentration. The syrup is at a temperature of 175–180° F. After immersion, the syrup is maintained at that temperature for about 5 minutes. The pickled vegetables are then packed in jars, sealed and pasteurized at a temperature of 170° F. for 3 minutes. These control products were satisfactory as prepared and exhibited good color, texture, and flavor for 3 to 6 months after packing.

Pickled vegetables of Example 6 were prepared in accordance with the above but containing in the overall end product, 0.015% of calcium disodium salt of ethylenediaminetetraacetic acid. The pickled vegetables of this example exhibited excellent color, texture, and flavor for periods in excess of 15 months. The vegetable materials so treated included cauliflower, onions, carrots, cabbage, watermelon, beets, and peppers alone and in combinations.

Pickled vegetables made in accordance with the invention require no additional facilities and negligible cost increase to prepare as compared to conventional facilities and processes. In addition, costs are further lowered because the storage life is increased significantly.

Alkylenediaminetetracarboxylic acid components, particularly ethylenediaminetetraacetic acid, as the free acid and as its edible salts, have been known to be useful food additives for enhancing the flavor life of food products containing fats, viz above 15 percent, by making such foods resistant to flavor defects arising as a result of oxidative deterioration. A surprising discovery made in this investigation is that the alkylenediaminetetracarboxylic acid component is effective in extending the flavor life of pickled vegetables, each of which contains fat in concentration less than 0.5 percent, for the most part between 0.1 and 0.2 percent, i.e. of pickled vegetables substantially free of fats susceptible to oxidation. The investigation further uncovered a synergistic relationship between the alkylenediaminetetracarboxylic acid component and calcium chloride in providing superior pickled vegetables with regard to the attainment and retention of uniform crispness throughout the entire vegetable pieces on production and aging.

While the invention has been described in connection with specific embodiments thereof, it will be understood that it is capable of further modifications and this application is intended to cover any variations, uses or adaptations of the invention, following, in general, the principles of the invention and including such departures from the present disclosure as come within known or customary practice in the art to which the invention pertains and as may be applied to the essential features hereinbefore set forth and as fall within the scope of the invention and the limits of the appended claims.

We claim:

1. A pickled vegetable product selected from the group consisting of cucumber, cauliflower, onion, carrot, cabbage, watermelon, beet, pepper, and combinations thereof, containing from about 0.004% to about 0.04% of an edible alkylenediaminetetracarboxylic acid component selected from the group consisting of ethylenediaminetetraacetic acid, ethylenediaminetetrapropionic acid, propylenediaminetetraacetic acid, propylenediaminetetrapropionic acid, ethylenediaminediacetodipropionic acid and the edible salts thereof, and from about 0.04% to about 0.10% of calcium chloride by weight.

2. A pickled cucumber product containing from about 0.004% to about 0.04% of an ethylenediaminetetraacetic acid component and from about 0.04% to about 0.10% of calcium chloride.

3. A pickled vegetable product comprising vegetables immersed in a syrup comprising sugar, acetic acid as vinegar, calcium chloride, and spices, the pickled vegetable product containing from about 0.004% to about 0.04% of an edible ethylenediaminetetraacetic acid component, by weight, and from about 0.04% to about 0.10% of calcium chloride, by weight.

4. A pickled vegetable product comprising cucumbers immersed in a syrup said pickled product containing from about 0.004% to about 0.04% by weight of edible ethylenediaminetetraacetic acid component and from about 0.04% to about 0.10% by weight of calcium chloride.

5. A process for preparing a pickled vegetable product which comprises:
   (1) immersing vegetable material selected from the group consisting of cucumber, cauliflower, onion, carrot, cabbage, watermelon, beet, pepper and combinations thereof, in a brine solution containing about 7% salt for a period of time of from about 1 hour to about 24 hours,
   (2) removing the vegetable material from the brine,
   (3) immersing the vegetable material in a hot syrup at 175°–180° F. containing acetic acid as vinegar, sugar, calcium chloride, and spices and an edible ethylenediaminetetraacetic acid component in a proportion such that the final product contains from about 0.004% to about 0.04% of the acid component and calcium chloride in a proportion such that the final product contains from about 0.04% to about 0.10% by weight, and maintaining the total product at 175°–180° F. for about 5 minutes,
   (4) packing the pickled vegetable material and the syrup in a suitable container, and
   (5) pasteurizing the pickled product at a temperature of about 170° F. for a period of time of about 3 minutes.

(References on following page)

References Cited

UNITED STATES PATENTS

| | | | |
|---|---|---|---|
| 1,998,179 | 4/1935 | Wolf | 99—222 |
| 2,732,386 | 1/1956 | Kuhrt | 260—398.5 |
| 2,910,367 | 10/1959 | Melnick et al. | 99—150 |
| 2,910,368 | 10/1959 | Melnick et al. | 99—156X |
| 2,910,369 | 10/1959 | Klein | 99—159 |
| 3,038,810 | 6/1962 | Akerboom et al. | 99—150 |
| 3,154,423 | 10/1964 | Voegeli et al. | 99—222 |
| 3,231,392 | 1/1966 | Sair | 99—159 |
| 3,255,019 | 6/1966 | Engelland | 99—156 |
| 3,374,099 | 3/1968 | Bell et al. | 99—156 |

NORMAN YUDKOFF, Primary Examiner

F. E. DRUMMOND, Assistant Examiner

U.S. Cl. X.R.

99—168, 222